(No Model.)

H. GALLAGER.
CLEVIS.

No. 601,560. Patented Mar. 29, 1898.

Witnesses
A. T. Hood.
A. B. Seibold.

Inventor
Henry Gallagher,
by his Attorneys

UNITED STATES PATENT OFFICE.

HENRY GALLAGER, OF SAVANNAH, GEORGIA, ASSIGNOR OF ONE-HALF TO JOHN J. McDONOUGH, OF SAME PLACE.

CLEVIS.

SPECIFICATION forming part of Letters Patent No. 601,560, dated March 29, 1898.

Application filed October 21, 1897. Serial No. 655,876. (No model.)

*To all whom it may concern:*

Be it known that I, HENRY GALLAGER, of Savannah, in the county of Chatham and State of Georgia, have invented certain new and useful Improvements in Clevises, of which the following is a specification, reference being had to the accompanying drawings and to the numerals of reference marked thereon.

My invention relates to an improved coupling device or clevis, the object of which is to produce in a simple form a ready means of connecting and disconnecting various objects for employment in the several arts.

My improved clevis embraces two parts, a yoke perforated at its ends and a pin adapted to enter the said perforated ends and provided with a curved arm extending laterally therefrom and embracing the curved part of the yoke.

In order to convey a fuller understanding of my invention, I will proceed to describe it in detail, referring to the accompanying drawings, in which—

Figure 1:
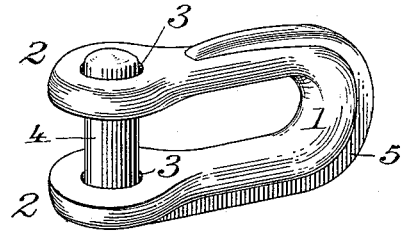
Figure 2:
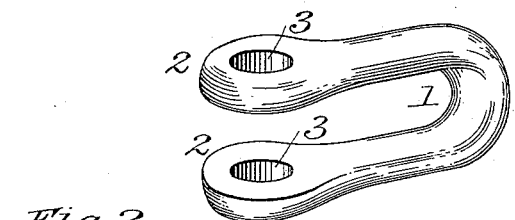
Figure 2:
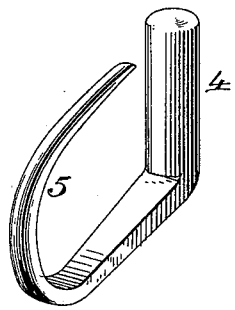

Figure 1 is a perspective view of my improved clevis, and Fig. 2 a similar view of the same with its parts detached.

Similar numerals of reference indicate similar parts in the respective figures.

1 is a yoke, its size being determined by the use to which it is intended to be put. The enlarged ends 2 of the yoke have through them holes 3, as shown. A cylindrical pin 4 of a length sufficient to pass through the holes 3 has an arm 5 extending laterally from one end at approximately a right angle to the pin. The arm 5 is curved, as indicated, and closely follows the contour of the yoke, so as to snugly embrace the same and lock the pin in its closed position, as seen in Fig. 1. The arm 5, which may gradually decrease in size from the point of connection with the pin to its end, may, as stated, be made to closely fit the yoke for the purpose of holding the arm in place thereon, or it may be retained in position by constructing the arm of spring metal, so that when it is in the position seen in Fig. 1 the arm will bear on the yoke with spring-pressure.

The operation of my invention is as follows: When it is desired to couple together two or more parts and the clevis is in the position indicated in Fig. 1, the arm 5 is swung around, disengaging it from the yoke, permitting the withdrawal of the pin 4, as seen in Fig. 2. The parts to be coupled are then placed within the yoke and the pin is returned to its position in the holes 4, passing on its way through one of the parts to be coupled—as, for instance, a plow-beam, an anchor-eye, &c. The arm 5 is then brought around until it embraces the yoke, which retains it in position. The act of uncoupling is simply the reverse of that of coupling.

When my clevis is in use, one of the coupled portions surrounds both the loop of the clevis and the correspondingly-curved portion of the arm, thus preventing the accidental opening of the arm.

It will be seen that the curved arm greatly strengthens the yoke by adding to it weight of metal.

It is obvious that the shape of the loop may be varied, provided that that of the arm be made to correspond, and that other departures from the construction herein described may be made without changing the essential features of the invention.

Having thus described my invention, I claim—

1. In a clevis, the combination of a yoke, a pin, and a curved arm embracing the yoke for retaining the pin in place, substantially as set forth.

2. In a clevis, the combination of a yoke, a pin, and a curved spring-arm embracing the yoke for retaining the pin in place, substantially as set forth.

3. In a clevis, the combination of a yoke, a pin adapted to pass through the ends of the yoke, and an arm on the pin embracing the yoke for retaining the pin in place, substantially as set forth.

In testimony whereof I have hereunto set my hand and affixed my seal, this 2d day of September, 1897, at the said city of Savannah.

HENRY GALLAGER. [L. S.]

Witnesses:
A. S. DELANNOY,
JOS. E. DELANNOY.